(12) United States Patent
Lin et al.

(10) Patent No.: US 8,166,464 B2
(45) Date of Patent: Apr. 24, 2012

(54) ANALYSIS AND DETECTION OF SOFT HANG RESPONSIVENESS PROGRAM ERRORS

(75) Inventors: Haoxiang Lin, Beijing (CN); Xi Wang, Beijing (CN); Zhenyu Guo, Beijing (CN); Xuezheng Liu, Beijing (CN); Zheng Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 12/163,806

(22) Filed: Jun. 27, 2008

(65) Prior Publication Data
US 2009/0328002 A1 Dec. 31, 2009

(51) Int. Cl.
*G06F 9/44* (2006.01)
*G06F 11/00* (2006.01)

(52) U.S. Cl. ........ 717/133; 717/124; 717/131; 717/132; 714/38.1

(58) Field of Classification Search .......... 717/124–135; 714/38.1
See application file for complete search history.

(56) References Cited

U.S. PATENT DOCUMENTS

| | | | |
|---|---|---|---|
| 5,828,883 A * | 10/1998 | Hall ............................... | 717/133 |
| 6,182,243 B1 * | 1/2001 | Berthe et al. ............... | 714/38.11 |
| 6,513,154 B1 | 1/2003 | Porterfield | |
| 6,587,966 B1 | 7/2003 | Chaiken et al. | |
| 6,665,758 B1 * | 12/2003 | Frazier et al. ................. | 710/200 |
| 6,823,507 B1 | 11/2004 | Srinivasan et al. | |
| 7,010,724 B1 | 3/2006 | Hicok | |
| 7,168,009 B2 | 1/2007 | Darringer et al. | |
| 7,383,470 B2 * | 6/2008 | Canning et al. ............. | 714/38.11 |
| 7,424,644 B2 * | 9/2008 | Canning et al. ................. | 714/34 |
| 2005/0015752 A1 | 1/2005 | Alpern et al. | |
| 2006/0053422 A1 | 3/2006 | Alikacem et al. | |
| 2006/0200702 A1 * | 9/2006 | Canning et al. ................. | 714/38 |
| 2007/0006170 A1 | 1/2007 | Hasse et al. | |
| 2007/0016894 A1 | 1/2007 | Sreedhar | |
| 2007/0234305 A1 | 10/2007 | Mishra et al. | |

OTHER PUBLICATIONS

Wang et al., "Hang Analysis: Fighting Responsiveness Bugs," Apr. 2008, ACM, p. 177-190.*
Smaragdakis, et al., "Combining Static and Dynamic Reasoning for Bug Detection", at <<http://www.cs.uoregon.edu/~yannis/tap07.pdf>>, pp. 16.
"Sun Enterprise xx00 Problem Solving Manual : Error Recognition, Actions, and Reporting Guide", at <<http://www.sunshack.org/data/sh/2.0/infoserver.central/data/910/910-4188/pdf/910-4188-11.pdf>>, Sun Microsystems, Inc., 2002, pp. 124.
"Troubleshooting Hardware Problems", at <<http://docs.sun.com/source/817-3886-10/chap07.html#22270>>, Sun Microsystems, Inc., 2004, pp. 27.

* cited by examiner

*Primary Examiner* — Anna Deng
*Assistant Examiner* — Qing Chen
(74) *Attorney, Agent, or Firm* — Lee & Hayes, PLLC (57) ABSTRACT

Analyzing and detecting soft hang program errors may lead to suggestions for either curing the programming errors at runtime or refactoring the source code. For instance, responsive function invocation patterns and blocking function invocation patterns may be used to detect soft hang program errors in a source code file. Deductive database rules may be compiled from the responsive and blocking function invocation patterns to find matching function invocations in a call graph.

16 Claims, 10 Drawing Sheets

ANALYSIS AND DETECTION OF SOFT HANG RESPONSIVENESS PROGRAM ERRORS

BACKGROUND

The use of personal computers has expanded over the years, with a vast and growing population of people using personal computers daily. Within that population are people who rely on software to perform functions ranging from work-related activities such as drafting memos to personal activities such as shopping on-line. With such a wide variety of tasks performed by computer programs, errors in these programs are common. Most personal computer users have experienced program errors: for example, sometimes a Graphical User Interface (GUI) action that was expected to respond instantly takes much longer to respond than anticipated, appearing to drive the application into a coma. While the application will typically respond after some delay, the application does not respond to user actions during this time. Such responsiveness issues generally occur in everyday productivity tools such as Web browsers, word processors, and other desktop applications; however, similar issues are known to occur with server applications as well. Such program errors can lead to loss in productivity and frustration.

Accordingly, there is a need to improve the responsiveness of software by analyzing and detecting program errors.

SUMMARY

This document describes techniques capable of enabling the analysis and detection of soft hang program errors. In some implementations responsive function invocation patterns representing functions that are expected to finish quickly and blocking function invocation patterns representing functions that are known to require too much time to finish are used to detect soft hang program errors in a source code file. In one implementation, a call graph is created from the source code file. As such, the call graph may contain at least one call path that includes a chain of function calls. Additionally, these techniques may enable the traversal of a call path to determine if a responsive function on the call path matches a blocking pattern. Further, these techniques may enable the output of the results of the pattern matching traversal. Also, in one implementation, runtime cures and source code refactoring are provided when blocking pattern matches are found.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed towards the detection and analysis of soft hang responsiveness program errors. The techniques involve the combination of human testing of executing programs and static, programmatic analysis of source code to detect and analyze blocking function calls. Blocking function calls, also called blocking invocations, are operations that consume a perceptible interval of time to finish, and unnecessarily prevent subsequent critical operations from being processed. A responsive call path, also called a critical call path, is a call path that contains time-critical invocations that are expected to complete in a timely fashion. The responsive property of a function invocation propagates down along the call graph to child function invocations: if a function invocation needs to be responsive, then all functions invoked by the responsive function must also be responsive. However, when a blocking invocation occurs along a responsive call path the software will hang. These soft hang program errors can lead to losses of responsiveness and poor user experience as well as degradation of performance. For instance, suppose a user clicks the mouse to access a file stored in memory and suddenly the application freezes. Consequently, the operating system may declare the application to be in the state of "not responding." Although the application will eventually return to life, during the long wait the user can neither cancel the operation nor close the application.

Soft hang responsiveness program errors are becoming one of the most significant issues with software. Furthermore, these hang bugs are difficult to find before software is released because they are application and context sensitive, and thus not readily apparent by inspection. Although some function invocations are always blocking, known as unconditional blocking function invocations, many function invocations only block in particular contexts, and are known as conditional blocking function invocations. For example, invocations to a connect function are always blocking because the connect function typically involves communication with remote computers, introducing numerous scenarios in which an invocation may not return in a timely manner. Invocations to GetFileAttributes, on the other hand, are only blocking if the file path parameter specifies a path to a file on a remote computer. If the file path parameter of GetFileAttributes is a path to a local file then GetFileAttributes will not block.

Therefore, GetFileAttributes is a conditional blocking invocation based on a "may-remote" property of the file path attribute.

Additional properties of parameters may be used to identify conditional blocking function invocations. A parameter may be "may-null" if the parameter's value may be null. A null parameter may cause a synchronous execution, causing a soft hang program error. Additionally, a "may-nonzero" or "may-positive" property may be assigned to a parameter that is known not to contain a value of 0. A parameter containing a value greater than 0 may cause a sleep function to wait for a non-zero amount of time, causing a soft hang program error.

Soft hang program errors may not be a program error in the traditional sense, such as a deadlock or exception. Instead, a soft hang program error may include software that produces the correct and intended outcome, but in doing so disrupts a user's experience by not returning a value for a finite period or generally not completing in a timely manner. Soft hang program errors may be particularly noticeable when they exist on a responsive call path, such as a UI thread.

Based on the context sensitive nature of soft hang responsiveness program errors, a formal model is necessary for detection. In one implementation the formal model utilizes the strengths of random, human testing and the strengths of programmatic static analysis. Blocking patterns may be extracted from runtime monitoring and supplemented with expert knowledge from software developers and program testers. The blocking patterns may be used to generate a set of deductive database rules that will be utilized during the static analysis phase. The deductive database rules may then be supplied to a static analysis framework that can search source code exhaustively for blocking function invocations that occur on a responsive call path. By exhaustively searching, the static analysis avoids many of the limitations of random testing, such as inadequate code coverage.

In one implementation, the static analysis framework uses a context-sensitive call graph to find all blocking function invocations located within a developer's source code and all library code invoked by the developer's source code. In one implementation, a context-insensitive analysis is applied to library code, while a full, context-sensitive analysis is applied to the developer's source code. In one implementation, all responsive call paths within the context-sensitive call graph may identified so that all blocking invocations on those call paths can be detected. However, when analyzing a context-insensitive call graph, some potential call paths may not be precisely analyzed, causing less accurate analysis than when using a complete, context-sensitive call graph.

Deductive database rules compiled from the responsive and blocking function invocation patterns are used to find matching function invocations in the call graph. A soft hang program error report can then be generated based on the existence of blocking invocations on one or more responsive call paths. Once soft hangs are discovered, suggestions can be made for either curing the programming errors at runtime or refactoring the source code.

The soft hang responsiveness program error detection and analysis techniques may be implemented in a number of ways. For purposes of discussion and illustration, the techniques are described in the context of a computer environment. One example implementation is provided with reference to the following figures, as described below in more detail. However, the techniques may be implemented in other contexts.

This brief introduction is provided for the reader's convenience and is not intended to limit the scope of the claims, nor the proceeding sections.

Overall Architecture of the Hang Analysis System

Figure 1:
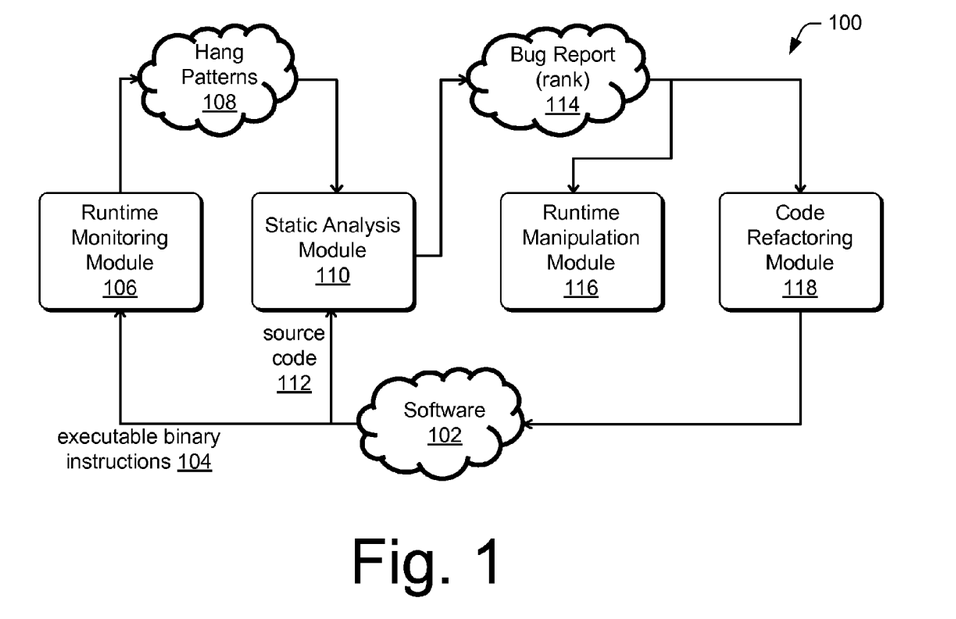
FIG. 1 depicts an illustrative hang analysis system.

FIG. 1 depicts an illustrative hang analysis system 100 in which detection and analysis of soft hang program errors may be implemented. In the system 100, a representative software program 102 may reside in a memory of a computer, and may be represented by source code 112 and compiled into executable binary instructions 104. In one implementation, a runtime monitoring module 106 may be utilized to record hang patterns 108 by running the executable binary instructions 104 and determining which function invocations take longer than a pre-determined threshold to return. Data from the runtime monitoring module 106 and augmented with data from experts, developers, and program testers may be combined to create hang patterns 108. Hang patterns 108 may include responsive function invocation patterns, indicating a function that is expected to return quickly, as well as blocking function invocation patterns that are expected to take more time to respond. The hang patterns 108 may be used to create deductive database rules to be used by a static analysis engine 110.

The static analysis engine 110 may analyze the source code 112 that was used to create the software program 102. The static analysis engine 110 may create a bug report 114 in which soft hang program errors are ranked in an order based on a priority. The static analysis engine 110 may consider several factors when prioritizing software errors in the bug report 114, such as whether a function invocation comprises a hot call path or a hot call site. A hot call path may represent a call path that is frequently encountered in a program. A hot call site may represent a function invocation that leads to many potential soft hang program errors. In one implementation, the soft hang program errors listed in the bug report 114 may be cured by a runtime manipulation module 116 or a code refactoring module 118. If a soft hang program error is cured by the code refactoring module 118, then the software may be further analyzed by the runtime monitoring module 106 and the static analysis engine 110.

In another implementation, the runtime manipulation module 116 may cure soft hang program errors in legacy software at runtime without changing the source code. For example, when an application hangs a user may press a hot key and the runtime manipulation module 116 may intercept functions that might block in order to avoid the hang. Further, for invocations to wait functions, where a long timeout exists, an exemplary runtime cure may include breaking the timeout into shorter intervals. Additionally, if a user presses a cure hot key, the exemplary runtime cure may return immediately with a timeout error code. Another example of a runtime manipulation cure may be used for function invocations that might block in the kernel, i.e. they do not call wait functions in the user space. In this example, the runtime manipulation module 116 may place the blocking function invocations in a queue to be processed by threads in a separate pool, thus avoiding processing the blocking invocation on a thread that is executing responsive functions. Additionally, the runtime manipulation module 116 may periodically check the status of the invocation, and return immediately with a preset error code if a user presses a cure hot key.

In yet another implementation, the soft hang program error may be cured by the code refactoring module 118 where manipulations to the source code 112 are done to avoid hang bugs which are found by the static analysis module 110. In this implementation, when a soft hang program error is detected, the source code 112 may be refactored to spawn a separate thread that processes the blocking function invocation, while a progress dialog allows the user to cancel the operation if it takes too long.

Systematic Approach to Soft Hang Program Error Detection

Figure 2:
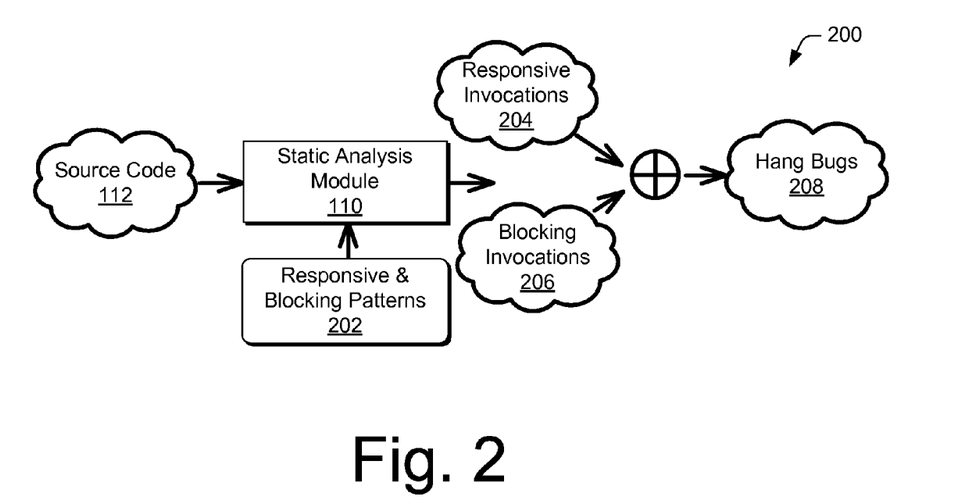
FIG. 2 depicts an illustrative process for detecting a soft hang program error using a static analysis module.

FIG. 2 schematically depicts an illustrative process 200 for detecting a soft hang program error using the static analysis module 110 of FIG. 1. The source code 112 may be analyzed by comparing responsive and blocking patterns 202 to the source code 112. The static analysis module 110 may identify responsive invocations 204 and blocking invocations 206. In one implementation, the responsive invocations 204 are generally function calls that are time-critical or are expected to complete in a timely fashion. Which function invocations contained in the source code 112 are responsive invocations 204 may be application specific, and defined by an expert or developer. In one implementation, responsive invocations 204 include message processing methods in Graphical User Interface (GUI) applications, event handlers in event-driven systems, message handlers, callbacks, and filter functions. Blocking invocations 206 are generally function calls that are time-consuming and can block for a perceivable interval, generally longer than a pre-determined threshold. In one implementation, blocking invocations 206 may call sleep functions or wait functions, networking and inter-process communication functions, or functions that interact intensively with Input/Output devices (I/O) or the central processing unit. As seen in FIG. 2, when a critical invocation 204 is also a blocking invocation 206, the function invocation comprises a hang bug 208, also called a soft hang program error.

In another implementation, a critical invocation 204 may directly call a blocking invocation 206. In this implementation, both the blocking invocation 206 and the critical invocation 204 may be hang bugs 208 as well. Similarly, in yet another implementation, a blocking invocation 206 which is called further down the call path of a critical invocation 204, as opposed to directly, may be a hang bug 208 as well.

Runtime Monitoring Architecture

Figure 3:
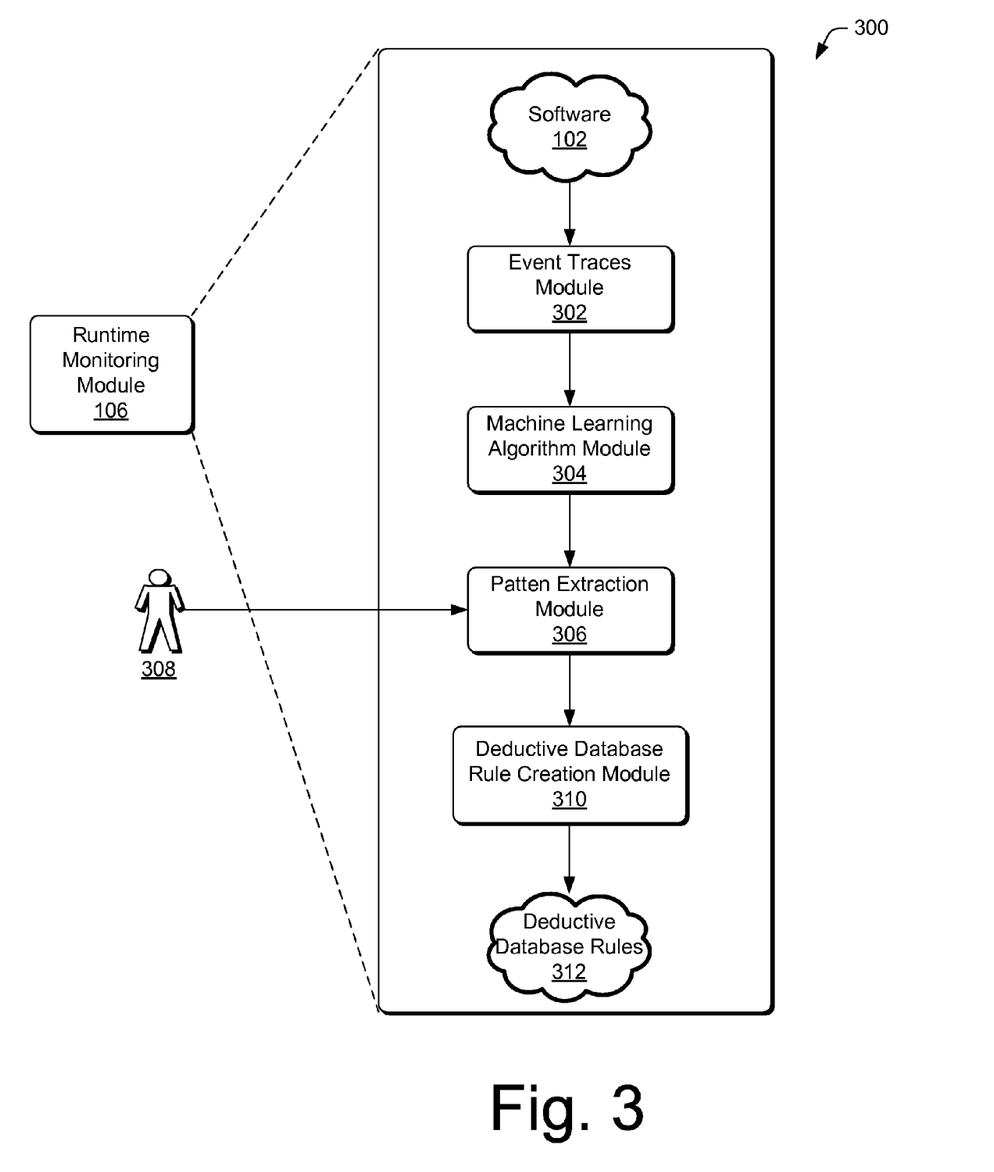
FIG. 3 depicts an illustrative runtime monitoring module which extracts responsive function invocation patterns and blocking function invocation patterns and generates deductive database rules.

FIG. 3 depicts an illustrative runtime monitoring module 300 which extracts responsive function invocation patterns and blocking function invocation patterns 202 from the software program 101, and generates deductive database rules 312. In one implementation, the software program 102, in the form of executable binary instructions 104, may be supplied to an event traces module 302. The event trace data captured from the software program 102 may then be supplied to a machine learning algorithm module 304. In this implementation, a pattern extraction module 306 may be capable of receiving data from both the machine learning algorithm 304 and a plurality of experts 308. The plurality of experts 308 may be made up of experts, developers, and program testers. The deductive database rule creation module 310 may then create deductive database rules 312 based on the patterns received from the pattern extraction module 306.

In one implementation, the event traces module 302 may collect data about function invocations that take longer than expected to return. This data may be collected directly from the executable binary instructions 104 of the software program 102. In this implementation, the machine learning algorithm module 304 may automatically generalize patterns from the event traces data collected by the event traces module 302. These patterns may be transmitted to the pattern extraction module 306.

In another implementation, the pattern extraction module 306 may collect crucial patterns for later use in identifying responsive patterns and blocking patterns. These patterns may be extracted from the machine learning algorithm module 304 or they may be specified by developers or testers using their knowledge of the source code 112. Additionally, these patterns may be independent of specific applications and may be applicable to the soft hang analysis of other software systems as well.

Static Analysis Architecture

Figure 4:
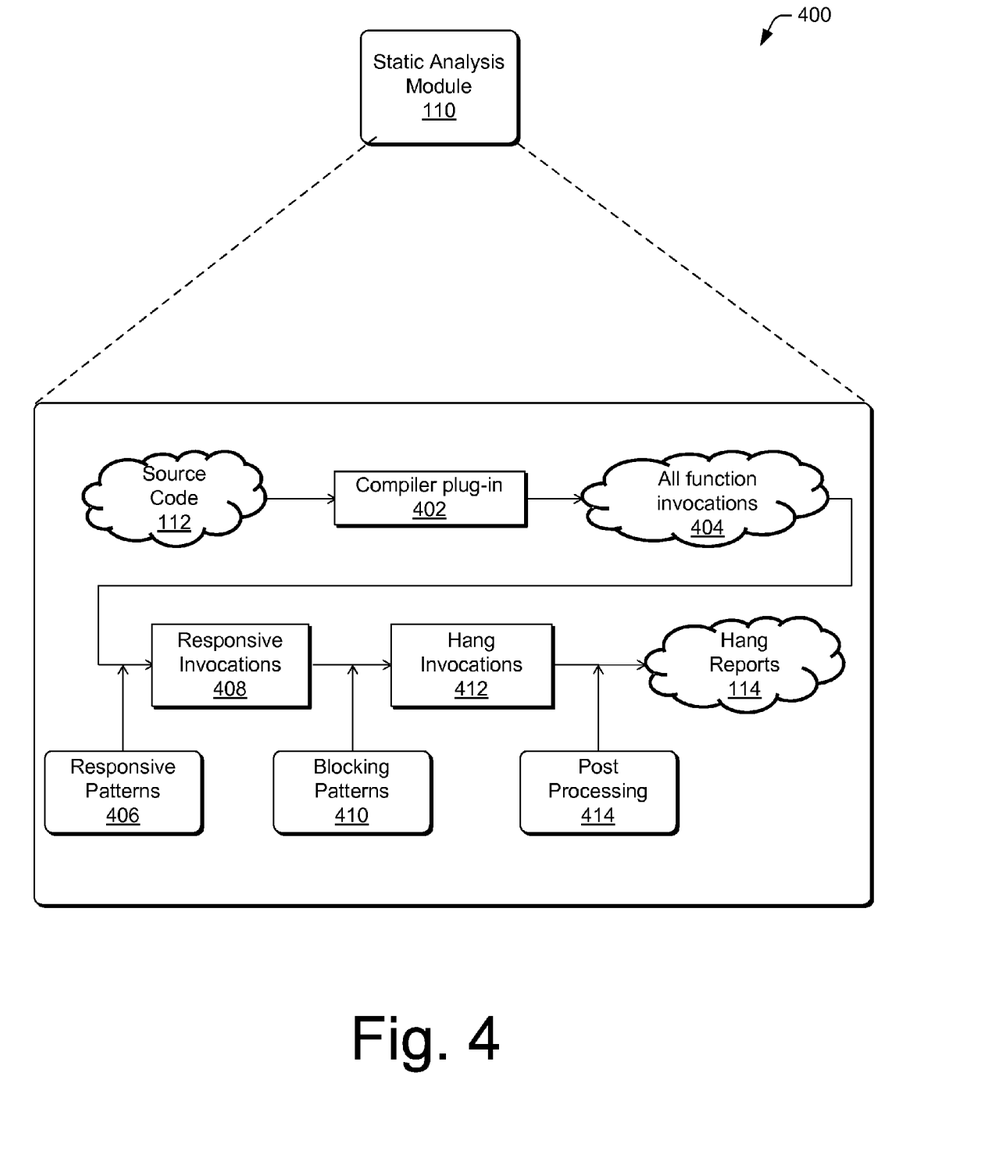
FIG. 4 depicts an illustrative process of a static analysis module for detecting soft hang errors in source code.

FIG. 4 depicts an illustrative process 400 of the static analysis module 110 for detecting soft hang errors in the source code 112. In one implementation, a compiler plug-in 402 receives the source code 112 and generates a set of all function invocations 404 declared in the source code 112. Additionally, the compiler plug-in 402 may generate a context-insensitive call graph and a context-sensitive call graph from the source code 112 by applying a set of semantic rules associated with the source code 112.

In one implementation, one or more responsive patterns 406 may be matched against all of the function invocations contained in the context-sensitive call graph, identifying all responsive invocations 408. In one implementation, the static analysis module 110 utilizes the deductive database rules 312 derived from the one or more responsive patterns 406 to match the all function invocations 404. In one implementation the responsive invocations 408 may comprise at least one function call that is expected to return quickly, based on the expectations of the user of the source code. Additionally, any function invocation that is a child of any of the responsive function invocations 408 may also comprise a responsive function invocation. In one implementation, the static analysis engine 110 analyzes the threads of execution created, started, and terminated by the source code 112 to more accurately identify child function invocations of the responsive function invocations 408.

In one implementation, one or more blocking patterns 410 may be applied to the responsive invocations 408 to determine if any of the responsive invocations 408 are hang invocations 412. In one implementation, the static analysis engine 110 may utilize deductive database rules 312 that are derived from the responsive patterns 406 to identify responsive invocations 408. Additionally, the deductive database rules 312 may be used to further reduce the set of responsive invocations 408 into the set of hang invocations 412. A post processing module 414 may merge multiple hang invocations 412 that are on the same call path into a single hang invocation 412. The post processing module 414 may also allow manual inspection of call paths that lead to soft hang program errors. The hang report 114 will be an approximation of soft hang program errors found within the source code 112 of the software program 102 of FIG. 1.

In another implementation, a completely context-sensitive analysis may be neither practical nor required for real-world, large-scale applications. Instead, the static analysis module 110 may perform context-sensitive analysis on the internal code of the software program 102 and context-insensitive analysis on the external libraries that are invoked by the internal code of the software program. This method may effectively lead to less false-positive results in soft hang error analysis.

Context-Insensitive Call Graph Architecture

Figure 5:
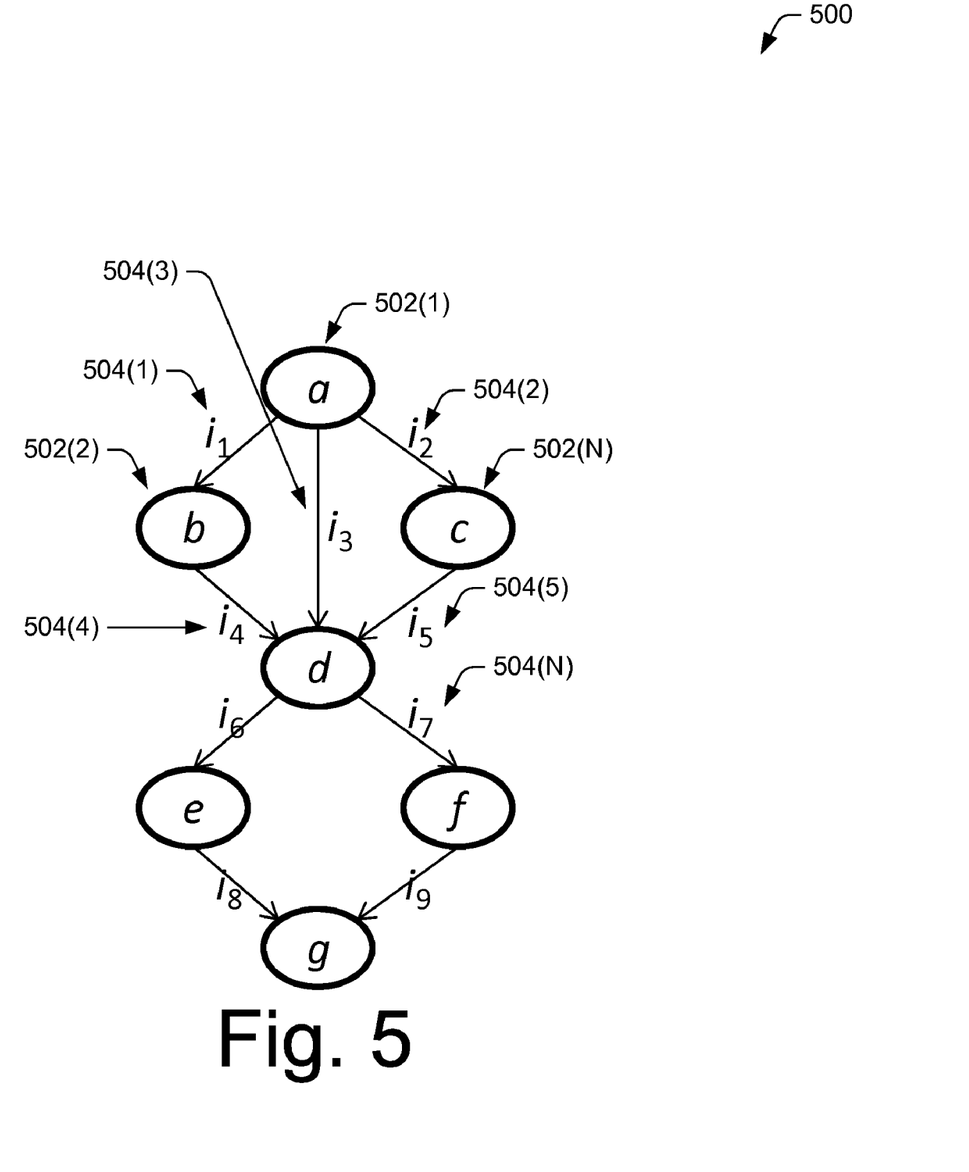
FIG. 5 depicts an illustrative a context-insensitive call graph which may consist of one or more functions represented by nodes of the graph, and one or more context-insensitive function invocations represented by edges of the graph.

FIG. 5 illustrates a context-insensitive call graph 500 which may consist of one or more functions 502(1), ..., 502(N), represented by nodes of the graph, and one or more context-insensitive function invocations 504(1), ..., 504(N), represented by edges of the graph. A context-insensitive function invocation is a function invocation that may be arrived at through multiple routes in the call tree. Every function in a context-insensitive call graph is represented by at most one node. A context-sensitive function invocation, on the other hand, distinguishes all possible invocations of a given function. This is indicated in a context-sensitive call graph by representing each potential invocation of a given function as a distinct node. Furthermore, a context-sensitive call graph includes a unique call path from a root node to each of these function invocation nodes.

A context-insensitive call path may consist of any discrete path from one function 502(1) to any other function 502(2-N). For example, in one implementation, a context-insensitive call path in FIG. 5 from node (a) to node (d) may consist of the context-insensitive function invocations 504(1) and 504(4). In another implementation, the call path from node (a) to node (d) may only consist of the context-insensitive function invocation 504(3). In yet another implementation, the call path from node (a) to node (d) may consist of the context-insensitive function invocations 504(2) and 504(5). Regardless of how the call graph arrives at node (d), functions subsequently invoked by function (d) are not aware of how function (d) was invoked, and are therefore context-insensitive.

Context Sensitivity Architecture

Figure 6:
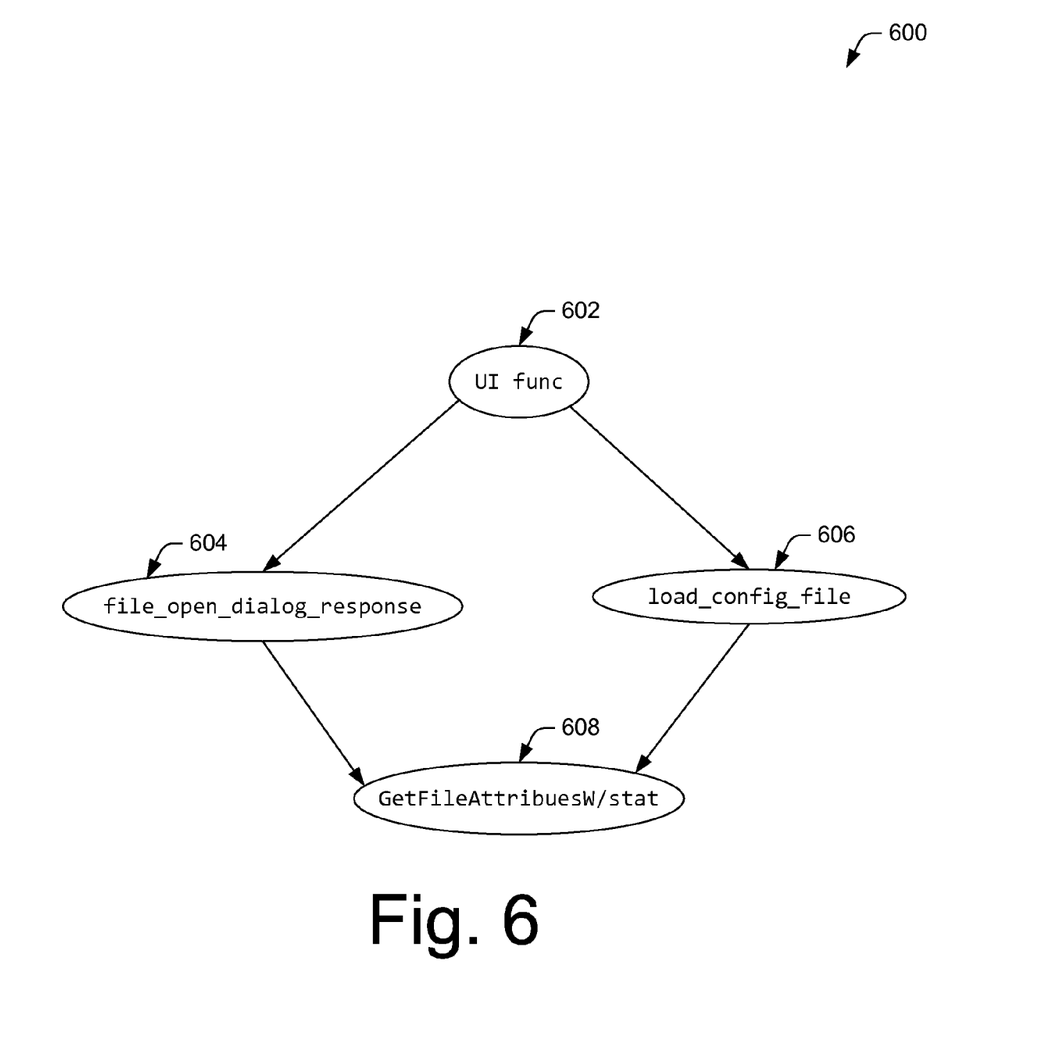
FIG. 6 depicts an illustrative call graph.

FIG. 6 depicts an illustrative call graph. A function is a conditionally blocking function when the function may or may not block, depending on the value passed as one of the function's parameters. For example, invocations of GetFileAttributes may block if the file path passed to GetFileAttributes causes GetFileAttributes to connect to a remote computer. However, if the same parameter only causes GetFileAttributes to read a local file's attributes, GetFileAttributes will almost certainly not block. Therefore, GetFileAttributes is a conditionally blocking function. On the other hand, invocations of connect always block, regardless of the parameters passed, because connect always connects to a remote computer. Consequently, connect is not a conditionally blocking function.

If the parameter passed to GetFileAttributes cannot be guaranteed to cause a non-blocking invocation, then the parameter has the property "may-remote". If, in another calling context, the parameter is known to cause a non-blocking invocation, the same parameter may not have the "may-remote" property. Knowing when a parameter has the "may-remote" property enables one implementation to more accurately determine when a function invocation is blocking.

For example, a User Interface function (UI func) 602 may invoke two different function calls, file_open_dialog_response 604 and load_config_file 606. Both file_open_dialog_response 604 and load_config_file 606 may invoke GetFileAttributesW 608. Whether the invocation of GetFileAttributesW 608 may be blocking depends on whether the parameter passed to GetFileAttributes W 608 is "may-remote". If the path to the specified file originates from file_open_dialog_response, it is not possible to know whether the file selected by the user is on a remote computer or not. Consequently, the parameter originating from file_open_dialog_response may be "may-remote." However, load_config_file always operates on a local file, and so it can be known that the parameter may not be "may-remote." By knowing the context in which GetFileAttributesW is called from, it is possible to know whether the path to the file has the "may-remote" property or not. Without this context-sensitive information, the analysis would result in many more false-positives.

Context-Sensitive Call Graph Architecture

Figure 7:
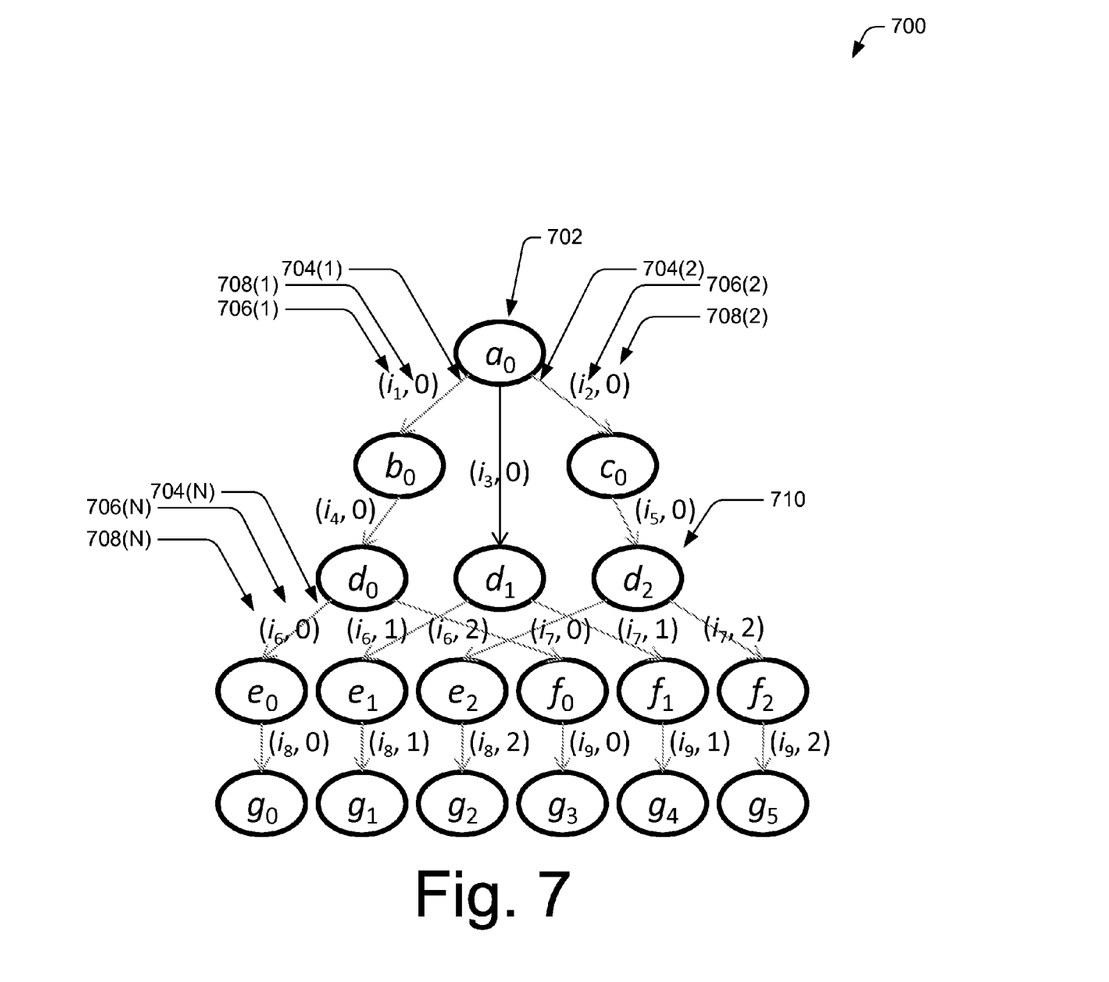
FIG. 7 depicts an illustrative context-sensitive call graph created by the static analysis module of FIG. 1.

FIG. 7 depicts an illustrative context-sensitive call graph 700 created by the static analysis module 110. In one implementation, the environment may include a root function node 702, and one or more function invocations 704(1) ... 704(N), represented by graph edges. In one implementation, each of the function invocations 704(1) ... 704(N) may be assigned a function invocation index 706(1), ..., 706(N) and a calling context index 708(1), ..., 708(N). The context-sensitive call graph 700 may contain a node for each unique way in which a function may be invoked. For instance, function d may be invoked in three different ways: function $a_o$ may call function d directly, or function $a_o$ may call function d through functions $b_o$ and $c_o$. implementation In one implementation, strongly connected components (i.e. direct or indirect recursive calls) may be reduced into one node.

As discussed previously, a function parameter may have a property that depends on specific contexts, for example a file path can be "may-remote" on specific call paths, but not others. In one implementation, a context-insensitive call graph 500 of FIG. 5 may be transformed into a context-sensitive call graph 700. The context-sensitive call graph 700 may be used to determine when a function invocation is a conditional blocking function invocation by tracing parameter values through possible invocation contexts.

In one implementation, the context-sensitive call graph 700 may be represented with an efficient data structure such as a binary decision diagram representation. Yet another implementation would allow a context-sensitive call graph 700 to be computed for each thread in the software program 102.

Soft Hang Program Error Examples

Figure 8:
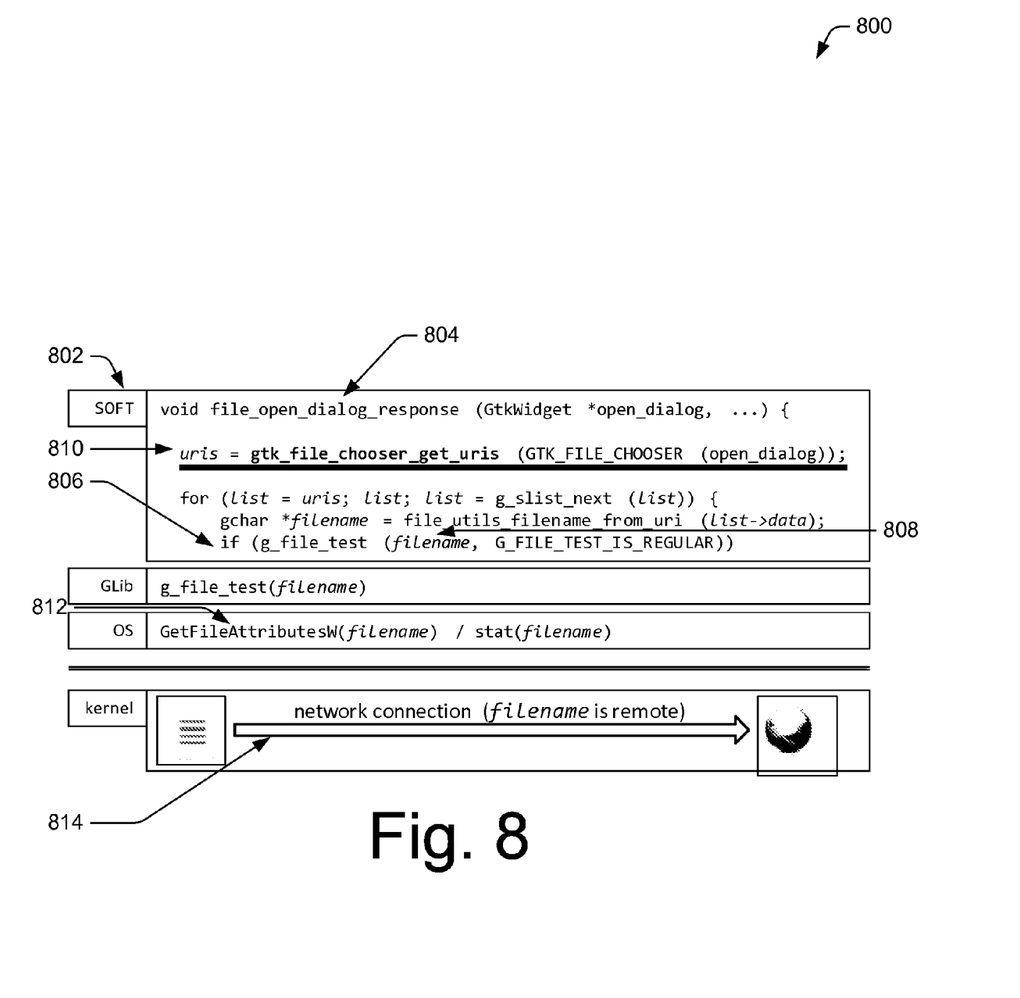
FIG. 8 depicts an illustrative example of source code that may cause a soft hang program error when executed on a computer.
Figure 9:
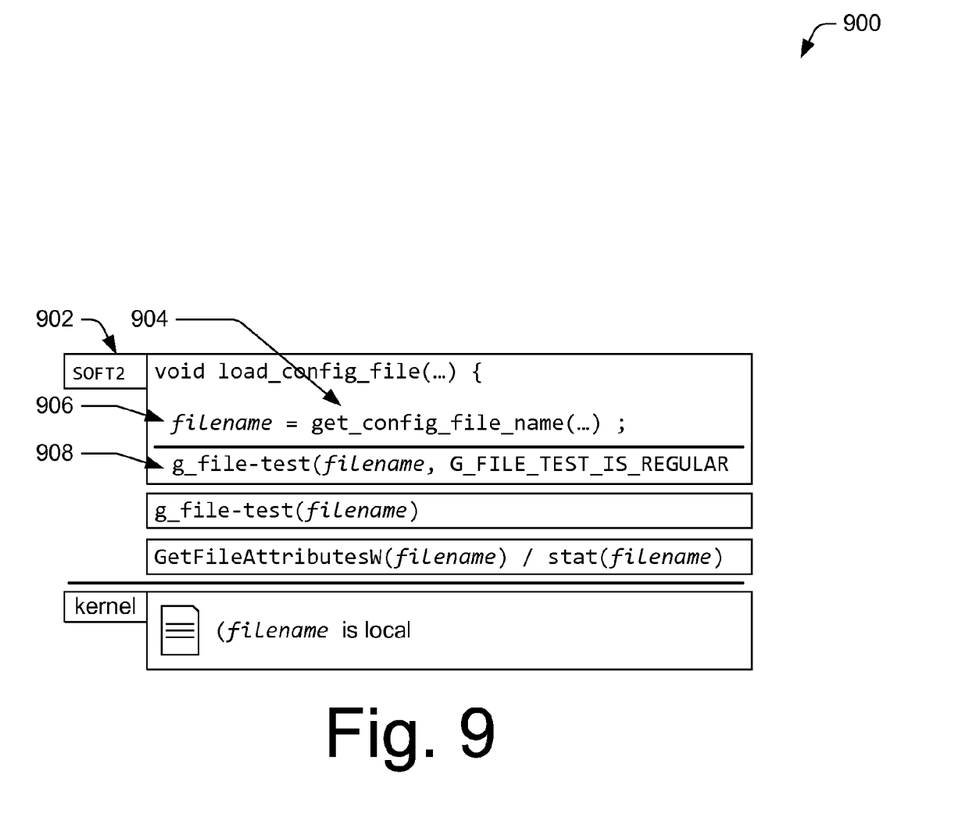
FIG. 9 depicts an illustrative source code that may not cause a soft hang program error when executed on a computer.

FIG. 8 depicts an illustrative source code 800 that may cause a soft hang program error when executed on a computer. A file_open_dialog_response function 804 may cause a soft hang program error by invoking a g_file_test function 806, and passing in a file path (otherwise known as a universal resource identifier, or uri) that may point to a remote file in a parameter filename 808. The file_open_dialog_response function 804 may call the gtk_file_chooser_get_uris function 806 to prompt a user to select one or more files, storing the result in a variable uris 810. Because the user may have chosen a remote file path, the variable uris 810 is assigned the "may-remote" property. In one implementation, the "may-remote" property of the variable uris 810 is tracked until the function g_file_test 806 is invoked. The function g_file_test 806 may call a function GetFileAttributesW 812, which may invoke a network connection 814. Because the value originating in the variable uris has been traced to the potential network connection 814, a soft hang program error has been detected. implementation FIG. 9 depicts an illustrative source code 900 that may not cause a soft hang program error when executed on a computer. In this implementation, one function invocation within a source code software SOFT2 902 is a call to a function get_config_file_name 904. The function get_config_file_name 904 returns a file name that may be stored in a variable filename 906. In this implementation, the variable filename 906 may not have a "may-remote" property, because the function get_config_file_name 904 is known to return a path to a local filename. Therefore, the static analysis module 110 may determine that a call to a function g_file-test 908 is a responsive function invocation.

Figure 10:
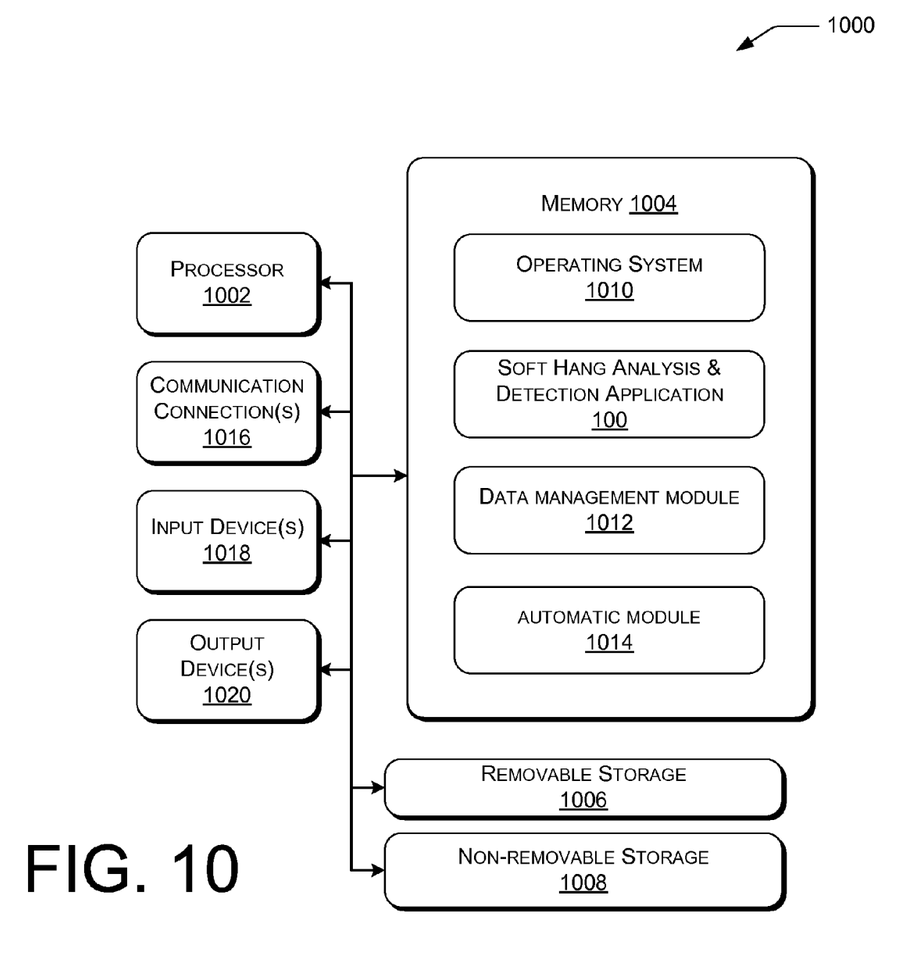
FIG. 10 depicts an illustrative processing functionality to create a soft hang analysis and detection system.

FIG. 10 illustrates an exemplary processing functionality 1000 to create a soft hang analysis and detection system. The processing functionality 1000 may be configured as any suitable computing device or server capable of implementing a soft hang analysis and detection system. In one exemplary configuration, the processing functionality 1000 comprises at least one processing unit 1002 and memory 1004. The processing unit 1002 may be implemented as appropriate in hardware, software, firmware, or combinations thereof. Software or firmware implementations of the processing unit 1002 may include computer- or machine-executable instructions written in any suitable programming language to perform the various functions described.

Memory 1004 may store programs of instructions that are loadable and executable on the processor 1002, as well as data generated during the execution of these programs. Depending on the configuration and type of computing device, memory 1004 may be volatile (such as RAM) and/or non-volatile (such as ROM, flash memory, etc.). The computing device or server may also include additional removable storage 1006 and/or non-removable storage 1008 including, but not limited to, magnetic storage, optical disks, and/or tape storage. The disk drives and their associated computer-readable media may provide non-volatile storage of computer readable instructions, data structures, program modules, and other data for the computing devices.

Memory 1004, removable storage 1006, and non-removable storage 1008 are all examples of computer readable storage media. Computer readable storage media includes volatile and non-volatile, removable and non-removable media implemented in any method or technology for storage of information such as computer readable instructions, data structures, program modules or other data. Memory 1004, removable storage 1006, and non-removable storage 1008 are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the server or other computing device.

Turning to the contents of the memory 1004 in more detail, the memory 1004 may include an operating system 1010 and one or more application programs or service for implementing the soft hang analysis and detection program 100. In one implementation, the memory 1004 includes a data management module 1012 and an automatic module 1014. The data management module 1012 includes but is not limited to identifying and tracking a session. The automatic module 1014 stores and manages information, such as session identifier, session state, computing devices of the user, and the like, and may communicate with one or more local and/or remote databases or services.

The memory 1004 further includes a user interface module 1016 and a session module 1018. The user interface module 1016 presents the user with the user interface to log in or log off, in and out of a session, and the like. The session module 1018 includes but is not limited to, tracking a state of the computing devices, logging in or logging off, connecting or disconnecting, and the like. The session module 1018 performs connections, disconnections, search functions, such as performing searches to identify the client devices that are logged on, logged off, state of the client devices, the status of the user, and the like.

The processing functionality 1000 may also contain communications connection(s) 1016 that allow the processing functionality 1000 to communicate with a stored database, another computing device or server, the user terminals, and/or other devices on the network. Communications connection(s) 1016 is an example of communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The processing functionality 1000 may also include input device(s) 1018 such as a keyboard, mouse, pen, voice input device, touch input device, etc., and output device(s) 1020, such as a display, speakers, printer, etc. The processing functionality 1000 may include a database hosted on the processing functionality 1000 including, but is not limited to, session data, network addresses, list of computing devices, and the like. All these devices are well known in the art and need not be discussed at length here.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claimed subject matter. For example, the methodological acts need not be performed in the order or combinations described herein, and may be performed in any combination of one or more acts.

Operation

Figure 11:
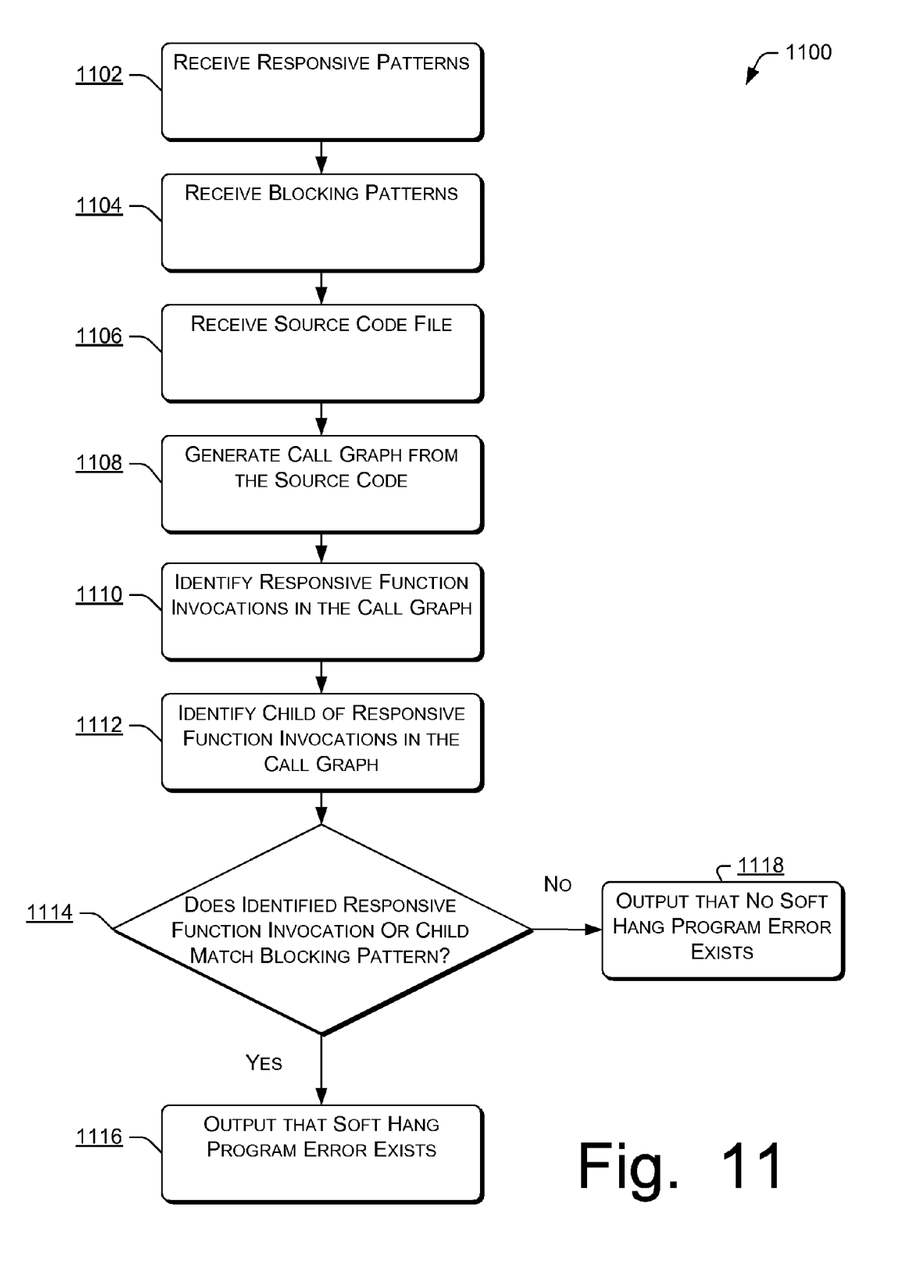
FIG. 11 depicts an illustrative process for analyzing and detecting soft hang program errors.

FIG. 11 depicts an illustrative process 1100 for analyzing and detecting soft hang program errors. The process is illustrated as a collection of blocks in a logical flow graph, which represent a sequence of operations that can be implemented in hardware, software, or a combination thereof. In the context of software, the blocks may represent computer-executable instructions that, when executed by one or more processors, perform the recited operations. Generally, computer-executable instructions include routines, programs, objects, components, data structures, and the like that perform particular functions or implement particular abstract data types. The order in which the operations are described are not intended to be construed as a limitation, and any number of the described blocks can be combined in any order and/or in parallel to implement the process.

For discussion purposes, the process 1100 is described with reference to the hang analysis system 100 of FIG. 1, the illustrative process 200 of FIG. 2, the illustrative runtime monitoring module 300 of FIG. 3, the illustrative process 400 of FIG. 4, and the illustrative context-sensitive call graph 700 of FIG. 7. In particular, many of the acts described below may be implemented and performed by the static analysis module 110 shown in FIGS. 1 and 4. Additional reference may be made to any of the renderings in FIGS. 1-10.

At 1102, one or more responsive patterns are received. This operation may be performed, for example, by the static analysis module 110. The responsive patterns may be received from many sources. In one approach, the responsive patterns may be received from the runtime monitoring module 106. Similarly, at 1104, one or more blocking patterns are received. This operation may also be performed, for example, by the static analysis module 110. The blocking patterns also may be received from many sources. In one approach, the blocking patterns may be received from the runtime monitoring module 106. In another approach, the blocking patterns may have been saved in local memory from a previous session, and may then be retrieved from local memory. In yet another approach, the blocking patterns may be received from the memory of a remote device.

At 1106, one or more source code files are received. This operation may be performed, for example, by the static analysis module 110 as above. Similarly, the source code file may be received from many sources. In one approach, the source code file may be received from an input device 1018, shown in FIG. 10. In another approach, the source code file may be received from a user of an exemplary processing functionality 1000, also shown in FIG. 10. In yet another approach, the source file may be received from a computer readable storage media device.

At 1108, a call graph is generated from the source code file. The operation may be performed, for example, by the static analysis module 110. The call graph may be generated in many ways. In one approach, the call graph may be generated as a context-insensitive call graph. In another approach, the call graph may be generated as a context-sensitive call graph. In yet another approach, the call graph may be generated to determine every function invocation on every call path of the source code file.

At 1110, responsive function invocations are identified in the call graph generated in 1108 from the source code. The operation may be performed, for example, by the static analysis module 110. Responsive function invocations may be identified in many ways. In one approach, responsive function invocations are identified by comparing them to responsive function invocation patterns. In another approach, deductive database rules are used to identify the responsive functions.

At 1112, children of responsive function invocations are identified in the call graph generated from the source code in 1108. This operation may also be performed, for example, by the static analysis module 110. Children of responsive function invocations may be identified in many ways. In one approach, children are identified by traversing the call graph 700. In another approach, child functions are identified using a thread-aware analysis, so that all functions invoked on a call path are invoked by the same thread.

At 1114, it is determined whether an identified responsive function invocation or an identified child of a responsive function invocation matches a received blocking pattern from 1104. If a responsive function or a child of a responsive function matches a blocking pattern (i.e., the "Yes" branch from act 1114), the process will output that a soft hang program error exists at 1116. In one implementation, the entire function call path rooted from the top identified responsive function to the matched function may be output, providing developers with full information to fix the soft hang error. Conversely, if a responsive function or a child of a responsive function does not match a blocking pattern (i.e., the "No" branch from act 1114), the process will output that no soft hang program errors exist at 1118. Thus the process may output the existence of a soft hang program error based on the comparison between responsive function invocations and blocking patterns.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, executed on one or more processors of a computer system, comprising:
    receiving a responsive function invocation pattern representing a function that is expected to finish within a first time period;
    receiving a blocking function invocation pattern representing a function that is expected to finish within a second time period, the second time period greater than a predefined threshold;
    receiving a source code file;
    generating a call graph from the source code file, the call graph including at least one call path, each of the at least one call path includes a chain of function invocations;
    identifying a responsive function invocation in the call graph that matches the responsive function invocation pattern;
    identifying at least one responsive child function invocation of the responsive function invocation;
    determining whether one of an identified responsive function invocation and the at least one responsive child function invocation in the call graph matches the blocking function invocation pattern; and
    if one of the identified responsive function invocation and the at least one responsive child function invocation in the call graph matches the blocking function invocation pattern, outputting that the matched one of the identified responsive function invocation and the at least one responsive child function invocation comprises a soft hang program error,
    otherwise outputting that no soft hang program errors were identified for the responsive function invocation pattern and the blocking function invocation pattern.

2. The method of claim 1, wherein the function that is expected to finish within the first time period comprises one of a Graphical User Interface (GUI) function, an event handler in an event-driven system, a filter function, and a function defined by a developer.

3. The method of claim 1, wherein the function that is expected to finish within the second time period comprises one of a sleep function, a wait function, a networking function, an inter-process communication function, a function that interacts extensively with Input/Output (I/O), and a function that performs extensive computations.

4. The method of claim 1 further comprising:
    receiving a conditional blocking pattern indicating when a function invocation comprises a blocking function invocation.

5. The method of claim 4, wherein the conditional blocking pattern includes a may-remote property indicating when a parameter of a function invocation may cause the function to execute code on a remote computer.

6. The method of claim 4, wherein the conditional blocking pattern includes a may-positive property indicating when a parameter of a function invocation may comprise a positive integer.

7. The method of claim 4, wherein the conditional blocking pattern includes a may-null property indicating when a parameter of a function invocation may cause the function to execute synchronous operations.

8. The method of claim 1, wherein identifying the at least one responsive child function invocation includes analyzing a thread of execution.

9. The method of claim 1, wherein the call graph is represented by a binary decision diagram.

10. The method of claim 1, wherein every function invocation in the call graph exists on a unique path to a root function invocation.

11. The method of claim 1 further comprising:
    modifying the source code file to convert a matching function invocation into a cancellable operation if the identified responsive function invocation in the call graph matches the blocking function invocation pattern.

12. The method of claim 1, wherein generating the call graph comprises:
assigning an invocation index to each function invocation in the source code file;
generating a call tree comprising function invocation nodes by:
traversing function invocations in the source code file according a set of semantic rules associated with a programming language;
creating a function invocation edge for each traversed function invocation;
creating a function node clone for each unique call path to each function invocation;
assigning to each function invocation edge the invocation index corresponding to the function invocation node; and
assigning to each function invocation edge a calling context index comprising a number in the range of 0 to n−1, where there are n invocations of the function invoked.

13. The method of claim 1 further comprising:
identifying function invocations that cause a soft hang program error in multiple calling contexts.

14. The method of claim 1, wherein the responsive function invocation pattern and the blocking function invocation pattern are received from one of: an expert, a developer, a program tester, and a diagnostic tool.

15. One or more computer-readable storage media storing computer-executable instructions that, when executed on one or more processors, direct the one or more processors to:
receiving a responsive function invocation pattern representing a function that is expected to finish within a first time period;
receiving a blocking function invocation pattern representing a function that is expected to finish within a second time period, the second time period greater than a pre-defined threshold;
receiving a source code file;
generating a call graph from the source code file, the call graph including at least one call path, each of the at least one call path includes a chain of function invocations;
identifying a responsive function invocation in the call graph that matches the responsive function invocation pattern;
identifying at least one responsive child function invocation of the responsive function invocation;
determining whether one of an identified responsive function invocation and the at least one responsive child function invocation in the call graph matches the blocking function invocation pattern; and
if one of the identified responsive function invocation and the at least one responsive child function invocation in the call graph matches the blocking function invocation pattern, outputting that the matched one of the identified responsive function invocation and the at least one responsive child function invocation comprises a soft hang program error,
otherwise outputting that no soft hang program errors were identified for the responsive function invocation pattern and the blocking function invocation pattern.

16. A computer system comprising:
one or more processors;
memory, accessible by the one or more processors; and
a soft hang program error detector stored in the memory and executable on the one or more processors to:
receiving a responsive function invocation pattern representing a function that is expected to finish within a first time period;
receiving a blocking function invocation pattern representing a function that is expected to finish within a second time period, the second time period greater than a pre-defined threshold;
receiving a source code file;
generating a call graph from the source code file, the call graph including at least one call path, each of the at least one call path includes a chain of function invocations;
identifying a responsive function invocation in the call graph that matches the responsive function invocation pattern;
identifying at least one responsive child function invocation of the responsive function invocation;
determining whether one of an identified responsive function invocation and the at least one responsive child function invocation in the call graph matches the blocking function invocation pattern; and
if one of the identified responsive function invocation and the at least one responsive child function invocation in the call graph matches the blocking function invocation pattern, outputting that the matched one of the identified responsive function invocation and the at least one responsive child function invocation comprises a soft hang program error,
otherwise outputting that no soft hang program errors were identified for the responsive function invocation pattern and the blocking function invocation pattern.

* * * * *